(No Model.)

G. C. HOWARD.
ELEVATOR.

No. 302,490. Patented July 22, 1884.

Witnesses
John M. Howard.
James M. Davenport.

Inventor
Geo. C. Howard

UNITED STATES PATENT OFFICE.

GEORGE C. HOWARD, OF PHILADELPHIA, PENNSYLVANIA.

ELEVATOR.

SPECIFICATION forming part of Letters Patent No. 302,490, dated July 22, 1884.

Application filed January 16, 1884. (No model.)

*To all whom it may concern:*

Be it known that I, GEO. C. HOWARD, a citizen of the United States, residing at Philadelphia, Pennsylvania, have invented certain Improvements in Elevators, of which the following is a specification.

My invention relates to an improvement in elevators in which friction-clutches are used to hold the rope-wheel at each pull of the rope, and also to act as a safety catch or brake if the car of an elevator should run more rapidly than the machine is adjusted for, whether occasioned by a careless operator or the breaking of any part of the machinery or ropes. I attain these objects by the mechanism illustrated in the accompanying drawings, in which—

Figure 1:
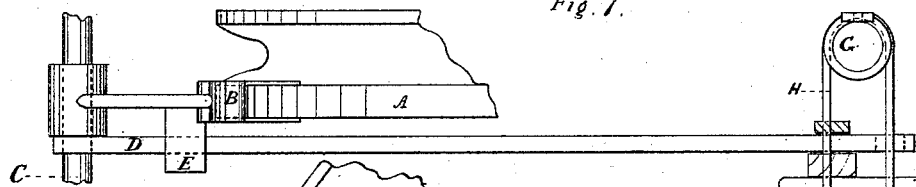

Figure 1 is a plan showing a part of a rope-wheel, A, clutch B in contact with the wheel-shaft C, on which clutch B and lever D turn. E is an ear with an elongated slot, through which lever D works freely, allowing clutch B to come in contact with the rim of the wheel, thus holding the load being lifted.

Figure 2:
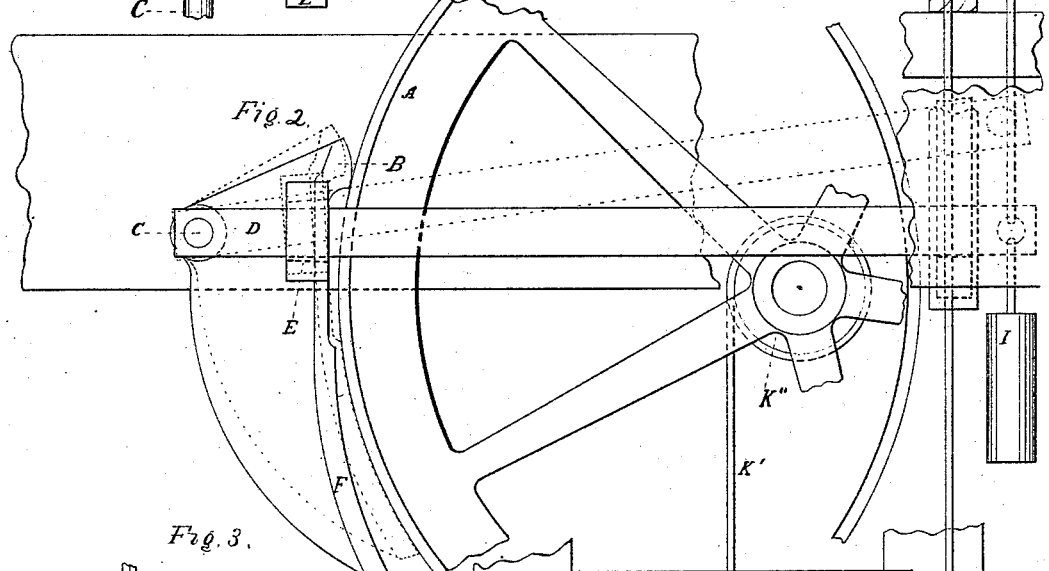

Fig. 2 is an elevation to more clearly show the various parts, similar letters being used in both views, having referred to A B C D E under Fig. 1. F is the brake; G, the circle over which the brake-rope passes; H, the brake-rope; I, the balance attached to lever D; J, balance-weight at end of brake-rope. K is the car. K' is the rope connecting car with drum K''; L, guides and case for safety-clutches.

Figure 3:
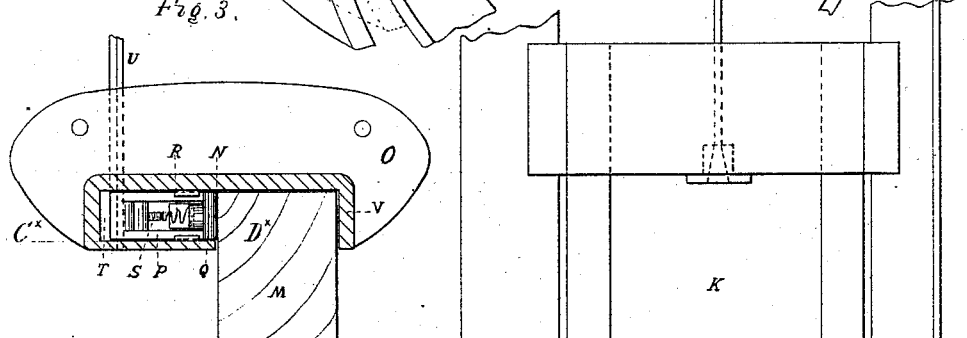
Figure 4:
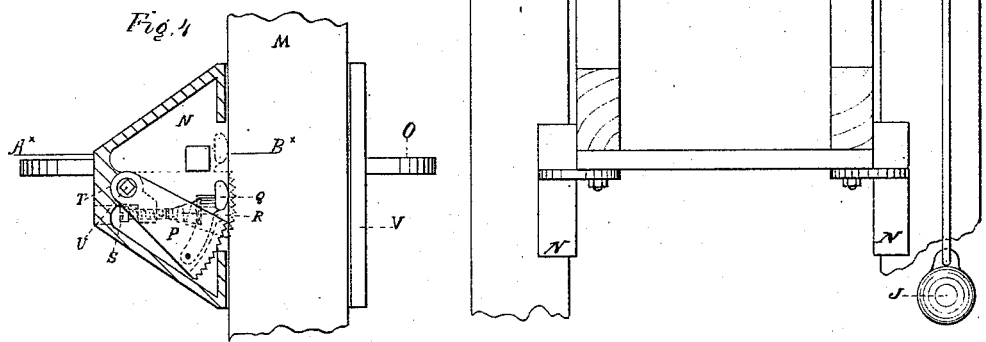

Fig. 3 is a plan of guide and case enlarged, and Fig. 4 an elevation. N is the case and guide flanges. O is a projecting flange for strengthening the case, and also answers to bolt the case to the under side of the car. P is the sector, with side pieces connecting it to a boss, against which it presses when in action, a boss between the side pieces answering as a nut for the set-screws S. Q is the friction-piece, connected to the sector P, bearing against the guide M. R is a spring used to press the friction-piece Q against the surface of the guide M, being adjusted with the set-screw S. T is a concave seat in case N, making a bearing for the sector P. U is a square shaft for connecting two clutches in opposite cases; V, guide-flange. The dotted lines in Fig. 2 show the clutch away from the pulley, the friction-brake in contact with rim for lowering. The full lines show the clutch in contact with the rim when hoisting. The full lines in Fig. 4 show the clutch as it lies when the car is moving at a slow speed, the dotted lines as it will be when the car moves at a too rapid speed, being lifted into contact with post M by the friction-piece Q.

As clutches have been used before in various machines, I do not make a claim for the principle; but What I do claim as my invention, and desire to secure by Letters Patent, is—

1. The combination of a brake and clutch, with a slot in the actuating-boss longer than the width of the lever actuating it, substantially as described.

2. A shoe connected with a clutch or brake to lift the clutch into contact with a guide, when the speed of the guide or shoe shall be increased beyond the limit for which the shoe and clutch have been set.

3. The combination of case N, guide M, sector P, shoe O, and spring R.

4. The friction piece or pieces bearing against a wheel or guide for the purpose of bringing a clutch or brake into contact with a wheel or guide to stop or control the speed of a moving body, substantially as described.

GEO. C. HOWARD.

Witnesses:
JOHN M. HOWARD,
JAMES M. DAVENPORT.